US011580822B2

(12) United States Patent
Srinivasan

(10) Patent No.: US 11,580,822 B2
(45) Date of Patent: Feb. 14, 2023

(54) SYSTEM AND METHOD FOR SPORTS WAGERING USING DYNAMIC REAL-TIME PRICING AND TRADING

(71) Applicant: SCORETRADE INC., Greenbrae, CA (US)

(72) Inventor: Bhuvanesh Srinivasan, Greenbrae, CA (US)

(73) Assignee: SCORETRADE INC., Greenbrae, CA (US)

( * ) Notice: Subject to any disclaimer, the term of this patent is extended or adjusted under 35 U.S.C. 154(b) by 9 days.

(21) Appl. No.: 17/008,625

(22) Filed: Aug. 31, 2020

(65) Prior Publication Data

US 2021/0104129 A1 Apr. 8, 2021

Related U.S. Application Data

(60) Provisional application No. 62/929,914, filed on Nov. 3, 2019, provisional application No. 62/928,955, filed on Oct. 31, 2019, provisional application No. 62/909,896, filed on Oct. 3, 2019.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G06Q 50/34*** | (2012.01) |

(52) U.S. Cl.
CPC ......... *G07F 17/3288* (2013.01); *G06Q 50/34* (2013.01); *G07F 17/3211* (2013.01); *G07F 17/3244* (2013.01)

(58) Field of Classification Search
CPC ............................ G07F 17/32; G07F 17/3211
USPC .................................... 463/1, 20, 22, 25, 39
See application file for complete search history.

(56) References Cited

U.S. PATENT DOCUMENTS

| | | | | |
|---|---|---|---|---|
| 10,147,266 | B2 * | 12/2018 | Joao | G07F 17/3288 |
| 2004/0230515 | A1 * | 11/2004 | Crosthwaite | G06Q 40/00 705/37 |
| 2012/0058815 | A1 * | 3/2012 | Ivanov | G07F 17/32 463/25 |
| 2017/0103614 | A1 * | 4/2017 | Simon | G07F 17/3288 |

* cited by examiner

*Primary Examiner* — Adetokunbo O Torimiro
(74) *Attorney, Agent, or Firm* — Lewis Roca Rothgerber Christie LLP

(57) ABSTRACT

A system for operating a sports gaming event using a graphical interface of a computing device application, the system including: a processor; and a memory coupled to the processor, wherein the memory stores instructions that, when executed by the processor, cause the processor to: receive sports data about a sporting event via a network; access a database of historical statistics relating to the sporting event and to players playing in the sporting event; select at least one betting scenario from a betting scenario database based on the sports data and the historical statistics; calculate an initial probability of the betting scenario occurring based on the sports data and the historical statistics; generate an initial price of the betting scenario based on the initial probability; display the betting scenario and the initial price on the graphical interface; and receive a response to the betting scenario from at least one user.

14 Claims, 10 Drawing Sheets

SYSTEM AND METHOD FOR SPORTS WAGERING USING DYNAMIC REAL-TIME PRICING AND TRADING

CROSS-REFERENCE TO RELATED APPLICATION(S)

This application claims priority to and the benefit of U.S. Provisional Patent Application No. 62/909,896 filed Oct. 3, 2019 and entitled "A PRICING AND TRADING METHODOLOGY FOR DYNAMIC REAL-TIME IN-GAME WAGERING", the entire content of which is incorporated herein by reference. This application also claims priority to and the benefit of U.S. Provisional Patent Application No. 62/929,914 filed Nov. 3, 2019 and entitled "A SYSTEM OF USING IN-STADIUM AND LOCATION-BASED USER INPUTS TO ADJUST IN-GAME WAGER PROBABILITIES AND PRICING", the entire content of which is incorporated herein by reference. This application further claims priority to and the benefit of U.S. Provisional Patent Application No. 62/928,955 filed Oct. 31, 2019 and entitled "A SYSTEM OF INTEGRATING AUTHENTICATED PAY TELEVISION STREAMS INTO MOBILE IN-GAME SPORTS GAMING APPLICATIONS", the entire content of which is incorporated herein by reference.

FIELD

One or more aspects of embodiments according to the present disclosure relate to systems and methods for sports wagering using dynamic real-time pricing and trading

BACKGROUND

Online gaming has increased in popularity, especially after the Supreme Court of the United States ruling that individual states could legalize sports gambling within their states. Online gaming players (e.g., users) can engage in online sports gaming through an application operating on a computing device. The application may include, but is not limited to, social media platforms, media streaming platforms, mobile device applications. The computing devices may include, but are not limited to, personal computers, mobile smart phones, or tablets. Using the various mediums, players can place bets on the final outcome of sporting events. In addition, bets or selections can be made in the context of fantasy sports, where the user is attempting to select a roster or portfolio of players. Players can submit bets using real money or with fake money generated within the computing device application.

The above information disclosed in this Background section is only for enhancement of understanding of the background of the present disclosure, and therefore, it may contain information that does not form prior art.

SUMMARY

Aspects of embodiments of the present disclosure are directed toward systems and methods for sports wagering using dynamic and real-time pricing and trading.

According to some example embodiments of the present disclosure, in a system for operating a sports gaming event using a graphical interface of a computing device application, the system including: a processor; and a memory coupled to the processor, wherein the memory stores instructions that, when executed by the processor, cause the processor to: receive sports data about a sporting event via a network; access a database of historical statistics relating to the sporting event and to players playing in the sporting event; select at least one betting scenario from a betting scenario database based on the sports data and the historical statistics; calculate an initial probability of the betting scenario occurring based on the sports data and the historical statistics; generate an initial price of the betting scenario based on the initial probability; display the betting scenario and the initial price on the graphical interface; and receive a response to the betting scenario from at least one user.

According to some example embodiments, the instructions further cause the processor to: determine a gaming event format based on the sports data; generate a plurality of betting scenarios according to the gaming event format; calculate the initial probability of each of the plurality of betting scenarios being successful; generate an initial price of each of the plurality of betting scenarios based on the initial probability of each betting scenario being successful, wherein the initial prices each include a number between 1 and 99; display the plurality of betting scenarios and the respective initial prices on the graphical interface; and receive a selection of a portfolio of betting scenarios from the at least one user, wherein the portfolio of betting scenarios are selected from the plurality of betting scenarios.

According to some example embodiments, the instructions further cause the processor to: receive updated sports data via the network; calculate an updated probability of the betting scenario being successful based on the updated sports data; generate an updated price of the betting scenario based on the updated probability; and display the updated price on the graphical interface.

According to some example embodiments, the updated price is based in part on responses received from the at least one user.

According to some example embodiments, the updated price is based in part on a location of the at least one user and on the response from the at least one user.

According to some example embodiments, the instructions further cause the processor to: receive updated sports data via the network; generate a new betting scenario based on the updated sports data; calculate an initial probability of the new betting scenario occurring based on the updated sports data; generate a new initial price of the new betting scenario based on the initial probability of the new betting scenario occurring; and display the new betting scenario and the initial price of the new betting scenario on the graphical interface.

According to some example embodiments, the response from the at least one user includes at least one of a buying of at least one share of the betting scenario and a selling of at least one share of the betting scenario.

According to some example embodiments, the sports data is received from a third party vendor via the network.

According to some example embodiments of the present disclosure, in a method for operating a sports gaming event using a graphical interface of a computing device application, the method including: receiving, by a processor, sports data via a network; generating, by the processor, a betting scenario based on the sports data; calculating, by the processor, an initial probability of the betting scenario occurring; generating, by the processor, an initial price of the betting scenario based on the initial probability, wherein the initial price includes a number between 1 and 99; displaying, by the processor, the betting scenario and the initial price on the graphical interface; and receiving, by the processor, a response to the betting scenario from at least one user.

According to some example embodiments, the method further including: determining, by the processor, a gaming event format based on the sports data; generating, by the processor, a plurality of betting scenarios according to the gaming event format; calculating, by the processor, the initial probability of each of the plurality of betting scenarios occurring; generating, by the processor, the initial price of each of the plurality of betting scenarios based on a respective initial probability, wherein each initial price includes a number between 1 and 99; displaying, by the processor, the plurality of betting scenarios and the respective initial prices on the graphical interface; and receiving, by the processor, a selection of a portfolio of betting scenarios from the user, wherein the portfolio of betting scenarios are selected from the plurality of betting scenarios.

According to some example embodiments, the method further including: receiving, by the processor, updated sports data via the network; calculating, by the processor, an updated probability of the betting scenario occurring based on the updated sports data; generating, by the processor, an updated price of the betting scenario based on the updated probability; and displaying the updated price on the graphical interface.

According to some example embodiments, the updated price is based in part on responses received from the at least one user.

According to some example embodiments, the updated price is based in part on a location of the at least one user and the response from the at least one user.

According to some example embodiments, the method further including: receiving, by the processor, updated sports data via the network; generating, by the processor, a new betting scenario based on the updated sports data; calculating, by the processor, an initial probability of the new betting scenario occurring based on the updated sports data; generating, by the processor, an initial price of the new betting scenario based on the initial probability of the new betting scenario occurring; and displaying, by the processor, the new betting scenario and the initial price of the new betting scenario on the graphical interface.

According to some example embodiments, the response from the at least one user includes at least one of a buying of at least one share of the betting scenario and a selling of at least one share of the betting scenario.

According to some example embodiments, wherein the sports data is received from a third party vendor via the network.

According to some example embodiments of the present disclosure, in a system for operating a sports gaming event using a graphical interface of a computing device application, the system including: a processor; and a memory coupled to the processor, wherein the memory stores instructions that, when executed by the processor, cause the processor to: receive sports data via a network; determine a gaming event format based on the sports data; generate a plurality of betting scenarios according to the gaming event format based on the sports data; calculate an initial probability of each of the plurality of betting scenarios occurring; generate an initial price of each of the plurality of betting scenarios based on the initial probability of each betting scenario, wherein each initial price includes a number between 1 and 99; display the plurality of betting scenarios and the initial price of each of the plurality of betting scenarios on the graphical interface; and receive a selection of a portfolio of betting scenarios from at least one user, wherein the portfolio of betting scenarios are selected from the plurality of betting scenarios.

According to some example embodiments, the gaming event format includes a single game format, a single team format, a multi-game format, a day long format, fantasy format, player props format, sequential player props format, possession-by-possession format, hole-by-hole format, time-limited format, and inning-by-inning format.

According to some example embodiments, the instructions further cause the processor to: receive updated sports data via the network; calculate an updated probability of each of the plurality of betting scenarios occurring based on the updated sports data; generate an updated price of each the plurality of betting scenarios based on the updated probability of each of the plurality of betting scenarios; and display the updated prices on the graphical interface.

According to some example embodiments, the sports data is received from a third party vendor via the network.

DETAILED DESCRIPTION

Figure 1:
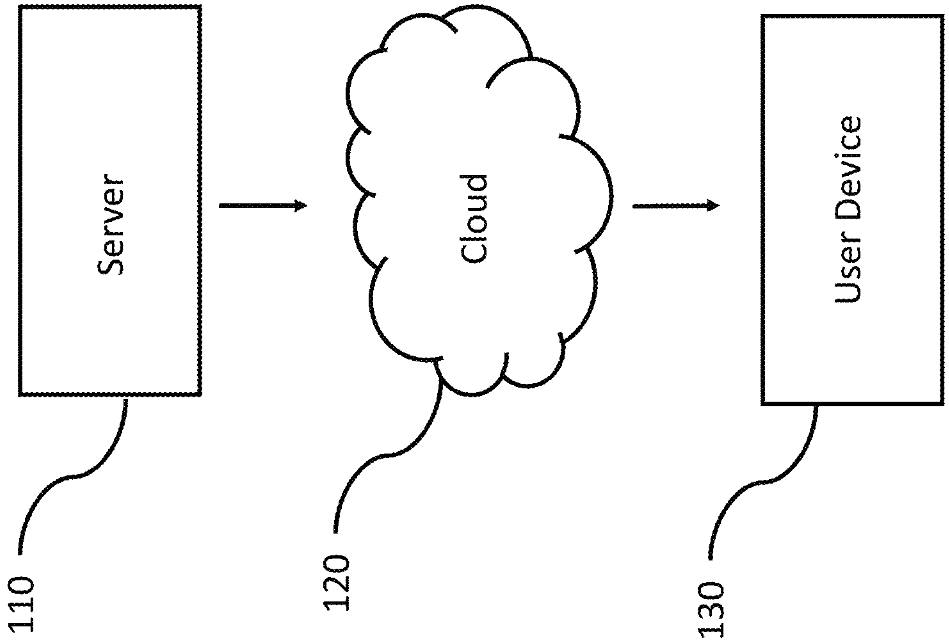
FIG. 1 illustrates a system block diagram for the operation of sports wagering using dynamic real-time pricing and trading according to an embodiment of the present disclosure.

The exemplary embodiments of the present invention disclosed herein are directed to a system and method for sports wagering using dynamic real-time pricing and trading. As used herein, a sports gaming event refers to an event wherein at least one user places at least one wager on at least one betting scenario (i.e., places a bet) displayed within an application and wherein the outcome of the wager is maintained by the application. As used herein, a sports gaming event can also refer to an event wherein at least one user sells a wager on at least one betting scenario to another user or to the "house" using an application. It will be appreciated that the term "sports" may refer to traditional sports such as soccer, baseball, and basketball, "esports" such as video games, as well as card games, board games, and any other competition on which betting scenarios could be generated. It will be further appreciated that "sports gaming event" and "gaming event" may be used interchangeably herein.

According to various embodiments of the present disclosure, a betting scenario within a sports gaming event can be generated automatically by a gaming engine. In one embodiment, the gaming engine may be configured to select a betting scenario framework from a database of betting scenario frameworks and the gaming engine may be further configured to customize the betting scenario framework with specific players as dictated by the gaming event being administered by the gaming engine.

For example, the gaming engine may be configured to select the betting scenario framework of "Player A will score X number of points within Y time period." If the gaming event being administered, for example, is a basketball game featuring the Los Angeles Lakers against the New Orleans Pelicans, the gaming engine may be further configured to generate a betting scenario of "Lebron James will score 16 points in the first half" based on statistical data obtained by the gaming engine that users often place wagers on Lebron James and based on statistical data about how many points Lebron James averages in the first half, among possibly many other statistical considerations.

The gaming engine may be further configured to associate a price with the betting scenario based on the gaming engine's determination of the likelihood of Lebron James scoring 16 points in the first half against the Pelicans in this particular game. As will be described in more detail below, the price will range between 0-99 based on the percentage likelihood that the event will occur, and more likely, the price will range between 1 and 99 unless Lebron James is not playing in the game, in which the price will be zero. For example, the gaming engine may determine that there is a 45% likelihood that Lebron James will score 16 points in the first half and therefore, the gaming engine may set the opening price at 45.

Once the game begins, the gaming engine may continuously update the price of the betting scenario based on data obtained by the gaming engine about the game. For example, if Lebron James scores 4 points in the first minute, the gaming engine may update the price to 65 based on the gaming engine's determination that it is now more likely that James will score 16 points in the first half. Further, for example, if James does not score any further points in the first quarter, the gaming engine may adjust the price to 25. Even though the examples given are based on set time periods (i.e., the first minute and the first quarter), as noted above, the gaming engine will continuously update the price of the betting scenario throughout the first half based on statistical information obtained about Lebron's play, including not only historical statistical information known by the gaming engine, but also statistical information obtained by the gaming engine from the particular game at issue.

The gaming engine can be an artificial intelligence or machine learning module that can generate bets via a data feed or application programming interface (API) for use by media companies, game makers, sports books, fantasy sports operators, and other third parties. In addition, the gaming engine can generate prices for the betting scenarios based on the probability (i.e., likelihood) of the betting scenario occurring. For example, the gaming engine may generate the betting scenario of Lebron James scoring eight points in the first quarter of a particular game and the gaming engine may determine that this betting scenario has a value of 55 based on gaming engine's prediction of the 55% likelihood of Lebron James scoring eight points in the first quarter of that particular game. As noted above, the gaming engine can update the prices of the betting scenarios in real-time as the probability of the betting scenario occurring changes throughout the duration of the sports gaming event.

In one example of a sports gaming event, a betting scenario generated by the gaming engine can be displayed on the interface of an application on a computing device (e.g., device). The computer device may include, but is not limited to, a personal computer, a mobile smart phone, or a tablet. In one embodiment, the user of the application is able to place a wager on a particular betting scenario (described in more detail below) using an interface (e.g., a bet selection interface) and the application is configured to update and maintain such user's point or cash total after the betting scenario has occurred or has not occurred.

In another example, after the user places a wager, the user can sell their wager to another user or to the "house" at a later time in response to changes of the price of the wager (or even if the price remains the same).

In another example of a sports gaming event, a tournament in which multiple users place wagers on numerous betting scenarios based on a specified set of events (e.g., a specified game or a specified group of games) or based on a particular time frame (e.g., a single day, a single sports tournament, or a single season), wherein the point totals of each player are maintained for the duration of the specified set of events or time frame, and a winner is declared at the end of the tournament. It will be appreciated that there are countless other sports gaming events which involve at least one user placing a wager on at least one betting scenario that could be generated by, run on, and/or maintained by the application according to embodiments of the present invention.

As used herein, a betting scenario refers to a particular outcome (e.g., a player will hit a home run within the next three pitches) coupled with a price, i.e., a value that indicates the likelihood of such event occurring. For any betting scenario, a user will have the ability to place a wager on the event occurring and will obtain a reward in the form of real money, pretend money, points, or another scoring method, if the event occurs and will not receive any money or points if the event does not occur.

As described in more detail below, the generated bet can be displayed to a user, and the user can place wagers on the probability that specific events that may occur within the duration of a live sporting event rather than merely the final outcome and that the price of any betting scenario can be dynamically adjusted depending on various factors including actual occurrences in the live sporting event as well as the number and size of wagers placed on that particular betting scenario by other users.

FIG. 1 illustrates a system block diagram for the operation of sports wagering using dynamic real-time pricing and trading according to an embodiment of the present disclosure.

Referring to FIG. 1, the server 110 can transmit data to and receive data from a computer network 120 such as the Internet. Further, the computer network 120 can transmit data to and data from a user device 130. The user device 130 may have an interface that can display a betting scenario and the price of the betting scenario generated by a gaming engine. Further, the user can use the user device 130 to place a wager on the betting scenario or trade a wager to another use via the interface.

In some embodiments, the server 110 can include a processor and memory storing instructions, where the processor executes the instructions to implement the gaming engine for managing the gaming event. While the terms "server," "processor" and "memory" are used herein in the singular, embodiments of the present disclosure are not limited thereto, and may be implemented by multiple computer systems and/or computer servers, each of which may have one or more processors and one or more memories (e.g., different types of memory such as persistent memory and volatile memory). Therefore, unless otherwise explicitly described otherwise, operations that are described herein as being performed or implemented on a server and/or by a processor and memory may be construed as including being implemented on multiple servers and/or by multiple processors and memories, where the multiple servers may perform substantially the same tasks (e.g., operating in parallel), may perform substantially different tasks (e.g., perform different aspects of embodiments of the present disclosure), or combinations thereof.

Figure 2:
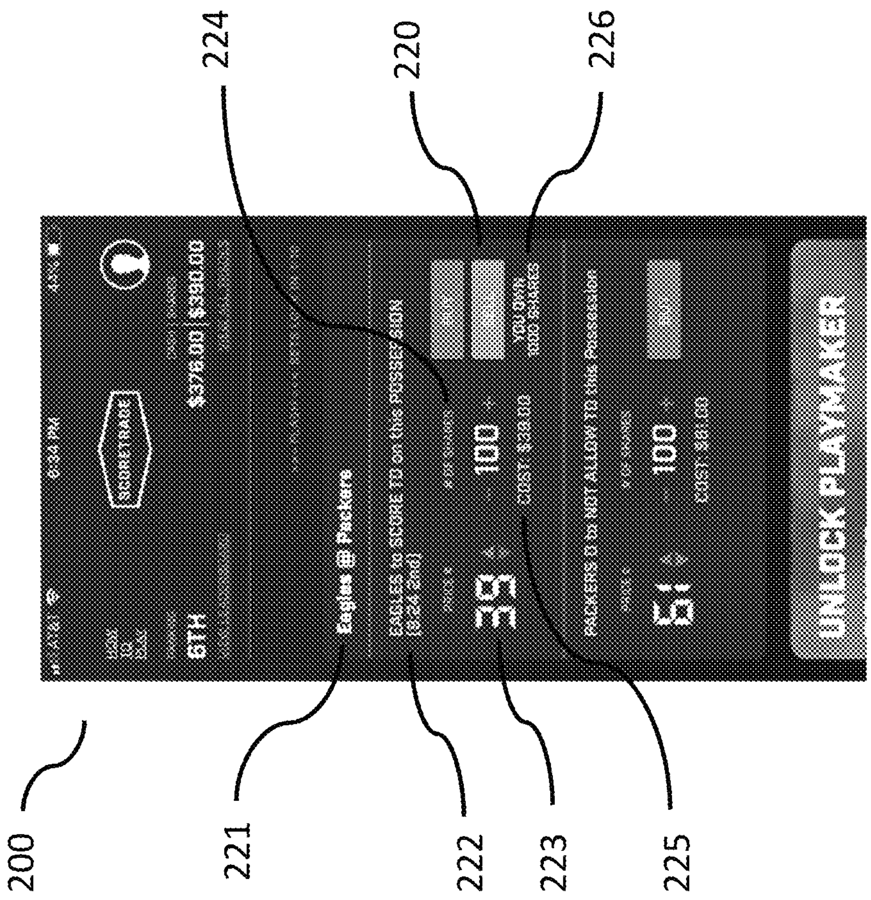
FIG. 2 illustrates an interface for displaying sports wagering using dynamic real-time pricing and trading according to an embodiment of the present disclosure.

FIG. 2 illustrates an interface for displaying sports wagering using dynamic real-time pricing and trading according to an embodiment of the present disclosure.

According to FIG. 2, a generated betting scenario can be displayed on a bet selection interface 220 within application interface 200. In various embodiments, the application interface 200 can be run on a computing device. The computing device may include a personal computer, a mobile phone, or a tablet, but is not limited thereto. A user can place a wager on the generated betting scenario at the displayed price using the bet selection interface 220. Additionally, the user can sell a wager to other users via the bet selection interface 220. It can be appreciated that while the bet selection interface 220 is one method for placing a wager on a generated bet and various other embodiments, other methods and interfaces can be used for placing a wager or selling a wager.

Referring to FIG. 2, the bet selection interface 220 may include information about the betting scenario including the title of a sporting event 221, a betting scenario description 222, and the price 223. For example, the price 223 may be a value of a single bet share, wherein the bet selection interface 220 may also include the ability for a user to choose the total number of bet shares 224 that they would like to wager and which is also displayed by the bet selection interface. Additionally, the bet selection interface 220 can include the ability for the user to sell a wager to another user at the price 223. Further still, the bet selection interface can display the total cost 225 of the betting scenario, the number of shares 226 of the betting scenario owned by the user, and buttons that allow a user to take certain actions, such as the ability to "Buy" or "Sell" a certain number of shares. It will be appreciated that the bet selection interface 223 could also display other information associated with the betting scenario including, for example, the duration of a time limit placed on the betting scenario, the number of shares of that betting scenario held by other users, and the total value of the amount that a user has available to wager on betting scenarios.

According to various embodiments, the betting scenarios can be automatically generated by a gaming engine. In some embodiments, the gaming engine can generate betting scenarios using sports data received, such as from third party providers, over a network (e.g., internet). The sports data can include, for example, statistical information about the most recent play, a player's current stats, a player currently in the game, a recent injury, a launch angle of a ball, the distance traveled by a ball, or other information about the live sporting event. It will be appreciated that the amount of data about particular sporting events that is tracked by available technology is significant and that the gaming engine can use any of this data by itself or in combination to generate and price betting scenarios.

In one embodiment, the gaming engine can take into account different types of gaming event formats and automatically generate betting scenarios that are relevant to a particular gaming event. The gaming event formats may include a single game, a single team, a multi-game, a day long, fantasy, player props, sequential player props, possession-by-possession, hole-by-hole, time-limited, inning-by-inning, or other sports gaming event formats.

In one embodiment, the gaming engine also can be purposed to look through the social media of users or sports fans in general, of groups of sports fans known to associate with one another, or based on college or pro team affinities, or the general social media in general during sporting events to detect the hottest trends or talked about events, and generate bets accordingly. The gaming engine uses this social media sentiment analysis to generate bets that have a greater and more timely appeal to gaming users.

In one example, the gaming event being administered may be a real-time in-game fantasy sports tournament which allows a user to choose a roster of players, to buy and sell shares of the players during the games played by such players, and to accumulate as many points, dollars, or other value to win the tournament. In other words, a "fantasy" sports tournament may be a gaming event that allows users to create an environment where the user can act as a "general manager" to assemble their own team, to keep track of various statistical attributes of that team, and compare their team to other teams based on the same statistical attributes. It will be appreciated that there are a countless number of ways to construct a fantasy gaming event, some of which will be described herein.

In some embodiments, the fantasy gaming events can be compressed into micro-events rather than a full game fantasy event, a full day fantasy event, or a full season fantasy event. For example, the fantasy sports tournament may be a 1-quarter fantasy event, or 1-inning fantasy event, and the fantasy gaming event can have a duration across either part of a game, across one game, or across multiple games. Fantasy sports tournament games may involve an entry fee of real money or another "fee," such as tokens of value, known to all entrants with a prize pool pre-determined and offered by a gaming operator (e.g., a human-based organization or entity overseeing the operation of a gaming event).

In another example, the gaming event may be a college basketball tournament where the gaming engine generates betting scenarios for each team remaining in the tournament to win its next game, wherein prices could be set for each remaining team, for example, to win its next game or to win the whole tournament as the tournament progresses.

Based on the gaming format selected, the gaming engine can then offer particular betting scenarios that a directed towards the selected gaming format. For example, if the gaming event selected is an entire game, then the gaming engine can generate betting scenarios directed to events that may occur over the entire duration of the game (e.g., the total number of points a particular player may score in the game) and it may also generate betting scenarios directed to events that may occur over less than an entire duration of the game (e.g., the total number of points a particular player may score in the first quarter, second quarter, or first half of the game, among many other scenarios). If the gaming event, on the other hand, is only directed to a particular inning of a baseball game, then the gaming engine could be configured to, for example, generate betting scenarios for how many pitches a particular pitcher may throw in that inning or how many runs may be scored by one or both teams in that inning. As will be appreciated, there are countless scenarios that could be generated by the gaming engine based on the type of gaming event being administered.

The type of gaming event may depend on live sporting events that are occurring. For example, the National Football League (NFL) may broadcast a number of football games at 1:00 PM ET on a Sunday, which may cause the gaming engine to generate betting scenarios for a multi-team real-time fantasy game. In other words, the gaming engine may be configured to choose from various betting scenario frameworks and assign specific variables (e.g., players, point values, and time period, among others) such that specific betting scenarios, including opening prices, can be generated for each game.

In another example, the NFL may only broadcast a single game on a Sunday evening, which may cause the gaming engine to generate betting scenarios for, for example, the full game, for one quarter, for the first two possessions, or for some other duration or situation that is less than the entire game length. It will be appreciated that the gaming engine may also generate betting scenarios for a full game, for a certain portion of a game, or for a certain game scenario whether the gaming event includes a single game or multiple games.

By way of example, the gaming event being administered via an application using the gaming engine may be a football game between the Green Bay Packers and the Philadelphia Eagles. In one embodiment, the gaming engine can follow the Packers-Eagles game using the sports data received from a third-party as described above.

In one embodiment, the gaming engine is configured to review a library of betting scenarios, logic, season statistics, recent player performances, and the players on the Packers offense to generate betting scenarios to offer to the participants of the gaming event.

For example, the gaming engine may be configured to evaluate all of the betting scenarios that may have historically been offered when the gaming event is a single football game. From that list, the gaming engine may be configured to offer a certain number (or all) of such betting scenarios to the participants taking part in the gaming event. In one embodiment, the gaming engine could be configured to offer the five most popular betting scenarios based, for example, on the number of transactions historically occurring on such a scenario or the number of betting points historically wagered on such a scenario.

The gaming engine may be further configured to offer betting scenarios that are the most popular betting scenarios for a particular gaming event. In the above example of the Packers-Eagles football game, for example, the gaming engine may be configured to offer betting scenarios for the entire duration of the game or for any limited duration of a game such as the first quarter, the last two minutes of the game, and the like. Further, in one embodiment, the gaming engine may be configured to monitor the game statistics and the wagering action on a particular gaming event and, as such, remove certain betting scenarios and add certain betting scenarios as the game progresses.

Continuing with the Packers-Eagle example from above, the gaming engine might be configured to generate and offer a bet that the Packers quarterback will complete his first pass to a particular wide receiver that has been performing well over his previous two games. As the Packers' possession progresses, the gaming engine could be configured to remove the initially offered bet and to be able to generate new betting scenarios based on recent plays and to generate betting scenarios involving various players.

When generating betting scenarios, the gaming engine can also consider the historical statistics of the players in the live sporting event, and may, for example, be configured to place more weight on more recent historical statistics. For example, the gaming engine can consider that Aaron Rodgers is a top quarterback in a quarterback-driven league in view of his recent and historical statistics, that he is a former Most Valuable Player (MVP) recipient, that he is a central focus of the Green Bay Packers' offense, that he recently threw for 345 passing yards, and that when Rodgers has a statistically good game, the Packers often win. Based on some or all of these considerations (as well as possibly many other considerations), the gaming engine could be configured to generate betting scenarios on Aaron Rodgers reaching certain achievements within a particular game. For example, the gaming engine can generate a betting scenario that Aaron Rodgers will throw three touchdowns in the current game, that the Packers will win the game by more than five points, and that the Packers will have more than fifty rushing yards in the first half.

In one embodiment, the gaming engine is configured to generate and offer betting scenarios that are of high volatility, in other words, betting scenarios whose price will fluctuate dramatically during a particular possession or period of time. Particularly, the gaming engine will be able to identify such high volatility betting scenarios based on its analysis of the sports data as described above and of historical data that relates to similar situations. For example, a highly volatile situation may occur regarding the outcome of a game where one team takes the lead late in the game and then the other team receives possession of the ball to try to retake the lead before the game clock expires. It will be appreciated that the gaming engine could learn these types of situations from analyzing the significant amount of historical sports data and could be configured to offer betting scenarios when the gaming engine encounters such situations in the gaming events being administered using the gaming engine.

In one embodiment, continuing the Packers-Eagle example discussed above, the gaming engine may be configured to evaluate at least one of, and more likely, many factors that could influence betting scenarios. Such factors may include, for example, the score, the time remaining, the most active statistical players in the game, whether there is a high-volatility situation in the game, whether there is a likely lead change based on field position, the weather conditions, the likelihood that the Packers may attempt to gain a first down or score a touchdown on fourth down versus kicking a field goal, among many other considerations.

According to various embodiments, the price 223 can also be automatically generated by the gaming engine. In one embodiment, the price 223 can be represented as a number 0-100, and can be based on the probability (i.e., likelihood) that the betting scenario will occur. For example, a betting scenario generated by the gaming engine and displayed on the bet selection interface 220 may have a 75% probability of success and, therefore, the price 223 may be 75. If the betting scenario occurs, then the probability will become 100% and the price 223 will become 100. If the betting scenario does not occur, then the probability will become 0% and the price 223 will become 0. After a betting scenario closes (i.e., the probability becomes 100% or 0%), the users that own shares of a successful betting scenarios can receive 100% of the betting scenario's maximum possible value for each share they own. It will be appreciated that the price of the betting scenario does not have to be directly tied to the percentage likelihood of the betting scenario occurring, but rather that the price could be a different value assigned by a formula taking into account the likelihood of the betting scenario occurring.

In one embodiment, the gaming engine is configured to calculate the probably of a betting scenario occurring, and thus be able to set a price for that betting scenario, based on, for example, the sports data received from a third-party provider or sports data received from users of an application including the gaming engine as well as historical data. In the Packers-Eagle example described above, such data will allow the gaming engine to determine, for example, whether the Packers offense is better than an average offense, whether the Packers quarterback is better than an average quarterback, whether the Eagles defense is better than an average defense, how often does the Eagles defense give up a rushing touchdown versus a passing touchdown versus a field goal depending on where the offense is on the field, among many other considerations.

According to various embodiments, the price 223 can change in real time as the probability of the betting scenario occurring changes. For example, the bet may be that a football team will score a touchdown on its current possession. If the football team is 80 yards from scoring a touchdown, the gaming engine may determine that the probability of scoring a touchdown may be lower and thus the price 223 may also be lower.

As the possession continues, the gaming engine may determine that the probability of scoring the touchdown fluctuates dynamically based on the play of the game. Accordingly, as the probability of scoring the touchdown fluctuates, the price 223 may also fluctuate according to the probability of the event occurring. For example, if the team gains yards and moves closer to scoring the touchdown, the gaming engine may determine that the probability of the betting scenario occurring, i.e., scoring the touchdown, may increase and therefore, the gaming engine may automatically increase the price 223. On the other hand, if the team loses yards and moves further away from scoring a touchdown, the gaming engine may determine that the probability of scoring the touchdown may decrease and therefore, the gaming engine may decrease the price 223. In one embodiment, the fluctuations of the price 223 may be represented in real time on the bet selection interface 220.

In one example, the gaming engine may have generated and offered the betting scenario of Aaron Rodgers completing two passes on the Packers' current possession. Accordingly, the gaming engine may be configured to evaluate the probability of this betting scenario occurring, and therefore, be able to set a price for this betting scenario, based on a number of statistical factors. For example, the gaming engine may consider the number of times Aaron Rodgers has historically completed two passes on a possession, the number of times Rodgers has completed two passes on a possession this season, the number of time Rodgers has completed two passes on a possession in this game, the strength of the Eagles defense, the Packers field position, the score of the game, how much time is remaining in the half or in the game, and the wind direction and strength, among many other considerations.

To continue with this example, if Rodgers throws an incompletion on first down, the gaming engine can be configured to reevaluate the likelihood that Rodgers will still complete two passes on this possession and thereby readjust the price as necessary. For example, the gaming engine may be configured to consider the percentage of times the Packers gain a first down after gaining no yards on first down, how often Rodgers throws again after throwing an incompletion and the like, as well as the score, time, and weather conditions that were the same or similar to (or, as the case may be, significantly different from) the previous play. For example, the gaming engine may determine that it is more likely that Rodgers will need to throw the ball after picking up no yards on first down and therefore, the gaming engine may increase the price of the betting scenario based on the higher likelihood of its occurrence.

In another example, the gaming engine may be configured to generate the betting scenario relating to a baseball game gaming event of the current hitter at the plate to be walked in this at-bat. To generate a price for this betting scenario, the gaming engine may analyze, for example, the hitter's career average of walks per plate appearance, the hitter's season average of walks per plate appearance, and the hitter's average number of walks per plate appearance for the last X number of games, wherein X could be chosen by the gaming engine as it determines how many previous games proves to be a good indicator that the hitter may walk in this plate appearance.

In this example, the gaming engine may also consider the pitcher's statistics, such as, for example, how often has the pitcher historically walked hitters, how often has the pitcher walked hitters this season, and how often in the last X number of games has the pitcher walked hitters, wherein X could be chosen by the gaming engine as it determines how many previous games proves to be a good indicator that the hitter may walk in this plate appearance. Based on some or all of the above considerations as well as other considerations such as the score, the inning, the weather, and whether there are any runners on base, the gaming engine may determine the likelihood of the hitter being walked in this at-bat, and thereby provide a price based on such determination.

Further, the gaming engine may be configured to adjust the price after each pitch thrown to the hitter. For example, if the first pitch is a strike, the gaming engine can evaluate statistics relating to how often the hitter has historically and recently walked with one strike, how often the pitcher has walked batters historically and recently with one strike, and the like, and based on those statistics as well as the relevant statistics considered before any pitches were thrown to this hitter, the gaming engine may be configured to adjust the price. As will be appreciated, the gaming engine could reevaluate the likelihood of the batter being walked by the pitcher each time a pitch is thrown, or even if the pitcher is changed in the middle of the at-bat.

In some embodiments, the user can sell a wager based on changes to the price 223. For example, a user can place a wager that a football team will score a touchdown on its current possession. At the time of the wager, the price may have been 20. As the possession progresses, the football team may move closer to scoring a touchdown. As a result, the gaming engine may determine that the probability of the betting scenario occurring may increase and the gaming engine may increase the price. For example, in this scenario, the price of the wager may increase to 50. The user can choose to sell the wager at that point and earn a profit of 30 per share. Alternatively, the user can choose to keep the wager to see if the betting scenario will occur and thereby reap the reward for such occurrence of the betting scenario.

In embodiments, when generating the price 223, the gaming engine can determine the probability that the betting scenarios will occur using various methods, which may include, but is not limited to, an algorithmic calculation, a human-selected probability, or a market-based probability based on weighing supply and demand indicators. Accordingly, the gaming engine may be configured to update the probabilities and prices as the play in a sporting event progresses.

In some embodiments, the gaming engine may be configured to follow a live sporting event by receiving sports data from third party providers. The sports data may include the most recent play, a player's current stats, whether a particular player is currently in the game, a recent injury to a particular player, and other information about the live sporting event.

In some embodiments, the gaming engine can also generate a price 223 based on users' betting activities. For example, the gaming engine may determine that a particular user has a tendency to place wagers when the price of a particular betting scenario occurring is set at a certain amount or is set with respect to a certain likelihood of that betting scenario occurring. As such, the getting may take this information into account when setting the price that is offered to a particular player.

In some embodiments, the gaming engine can also use the geographic location of a user to determine the price 223. In one embodiment, the gaming engine may be configured to track the geographic location of a user using the mobile location data of the user's device. The mobile location data may include a user check-in through an application, automated location tracking from the application, tracking the user's car in the stadium parking lot, the proximity to another user at the stadium, through social media tracking, or any other permutation or mechanism of determining that the user is at the stadium or can otherwise view the sporting event in real time.

According to one embodiment, a user may be watching a game in person at the stadium (i.e., an in-stadium user) and the in-stadium user may place a wager or sell a wager based on a play that recently occurred in that game. In one embodiment, the gaming engine may be configured to determine a user's location using GPS coordinates communicated to the gaming engine via their mobile device, or another methodology as understood in the art.

Due to a delay between occurrences of a live event and the broadcast of such occurrences to a user's device or to another medium viewable by the user, the in-stadium user may see a play in the game before other users following the game on other mediums such as on a live box score, play-by-play data, social media feedback, or on a live broadcast due. Accordingly, the gaming engine may receive the in-stadium user's selection before receiving sports data from the third-party provider which may influence the gaming engine to adjust the cost of the betting scenario for some users. For example, the in-stadium user's selection may be indicative of the most recent play and can suggest that the probability of an outcome has changed before the gaming engine receives the sports data for that particular game. For example, the in-stadium user may own a bet that a baseball player will hit a home run in his current at bat. The in-stadium user can see that the player has grounded out before other users and know that the probability of the player hitting a home run will decrease to zero. The in-stadium user may then try to sell the bet before the price 223 decreases to 0. The gaming engine can be configured to correct for this user advantage by obtaining the in-stadium user's betting information, identifying the user as an "in-stadium user," and by using the in-stadium user's activities to set the price 223. For example, the gaming engine can begin decreasing the price 223 based on the in-stadium users' activities before the gaming engine receives the outcome of the at bat from the third party provider.

Figure 3:
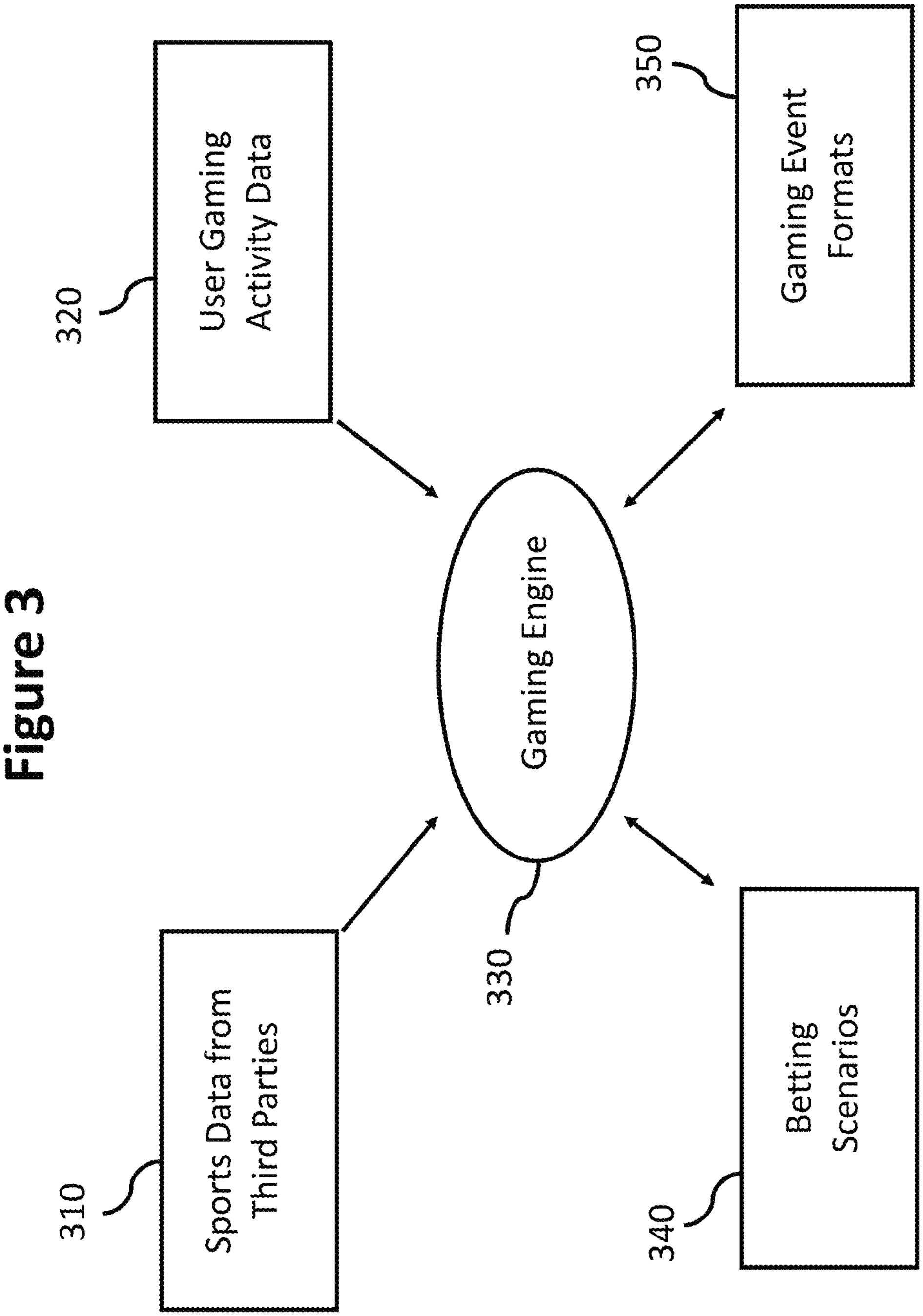
FIG. 3 illustrates a system block diagram for the operation of the gaming engine using dynamic real-time pricing and trading according to an embodiment of the present disclosure.

FIG. 3 illustrates a system block diagram for the operation of the gaming engine using dynamic real-time pricing and trading according to an embodiment of the present disclosure.

Referring to FIG. 3, the block diagram illustrates one embodiment of the functioning of the gaming engine 330 as discussed above. Particularly, the gaming engine 330 can receive sports data from third parties 310 and user gaming activity data 320. In some embodiments, the sports data 310 can include, for example, statistical information about the most recent play, a player's current stats, a player currently in the game, a recent injury, a launch angle of a ball, the distance traveled by a ball, or other information about the live sporting event. It will be appreciated that such sports data can be received from a single source or can be aggregated from many different sources. It will be further appreciated that such sports data can include statistics relating to a live sporting event, but can also include statistics from past sporting events as well as information about future sporting events (e.g., the probable starting pitcher for a baseball game, the probable starting lineup for a basketball game, the probable starting tee time for a golfer, and the like).

In some embodiments, the user gaming activity data 320 may be wagers placed on the bettering scenarios by various users or other information that the gaming engine 330 can receive and analyze based on user input.

In one embodiment, the gaming engine 330 may be configured to include or have access to a gaming event format database and/or a betting scenario database which respectively include a number of gaming event formats and betting scenarios. In embodiments, an administrator (i.e., a person) may manually input gaming event formats and/or betting scenario frameworks into the respective database.

For example, the gaming event database may include gaming event formats 350 such as a single game, a single team, a multi-game, a daylong event, a fantasy event, a player props event, a sequential player props event, events that are possession-by-possession, hole-by-hole, time-limited, inning-by-inning, and other sports gaming event formats.

The gaming engine 330 may be configured to select one or more of such gaming event formats from the gaming event format database and to offer one or more of the gaming event formats to users. In one embodiment, the gaming event formats may be offered to users via a graphical interface of an application and in a further embodiment, the gaming events may be broken down into categories, such as by sport, by type (e.g., fantasy, single, wagering opportunities, and the like), and by league, among others. Further, in one embodiment, the gaming engine 330 may be configured to offer only the most popular gaming event formats for each sport. For example, even though the gaming event format database may include more than one hundred baseball gaming event formats, the gaming engine may be configured to offer only a subset of all of the gaming event formats, for example, the three most popular baseball gaming event formats. Accordingly, a user may then be able to select one or more gaming events in which to participate based on those offered by the gaming engine.

Further, in one embodiment, the betting scenario database may be configured to include a number of betting scenarios, such as "Player X will score Y number of points in Z time period," "Team A will score B number of goals in C time period," "Pitcher D will throw E number of pitches in F period of a baseball game." It will be appreciated that there are a countless number of betting scenarios that could be stored in the betting scenario database and which could be offered to users by the gaming engine 330, but that the gaming engine could be configured to determine the more popular betting scenarios based on, for example, how many wagers have historically been placed on each scenario or how much value has historically been wagered on each scenario.

In one embodiment, the gaming engine 330 may be configured to offer only the most popular betting scenarios, wherein the betting scenarios may be categorized such as by sport, by gaming event format, by player, or the like. As such, based on, for example, the thousands of betting scenarios that could be stored in the betting scenario database relating to a basketball game, the gaming engine 330 may be configured to offer betting scenarios relating to only the three top scoring players on each team, and more specifically, the gaming engine may be configured to offer betting scenarios only relating to each of such top three scorers scoring at least a certain number of points in a certain amount of time. Accordingly, a user may then be able to select one or more betting scenarios in which to participate based on those offered by the gaming engine 330.

Figure 4:
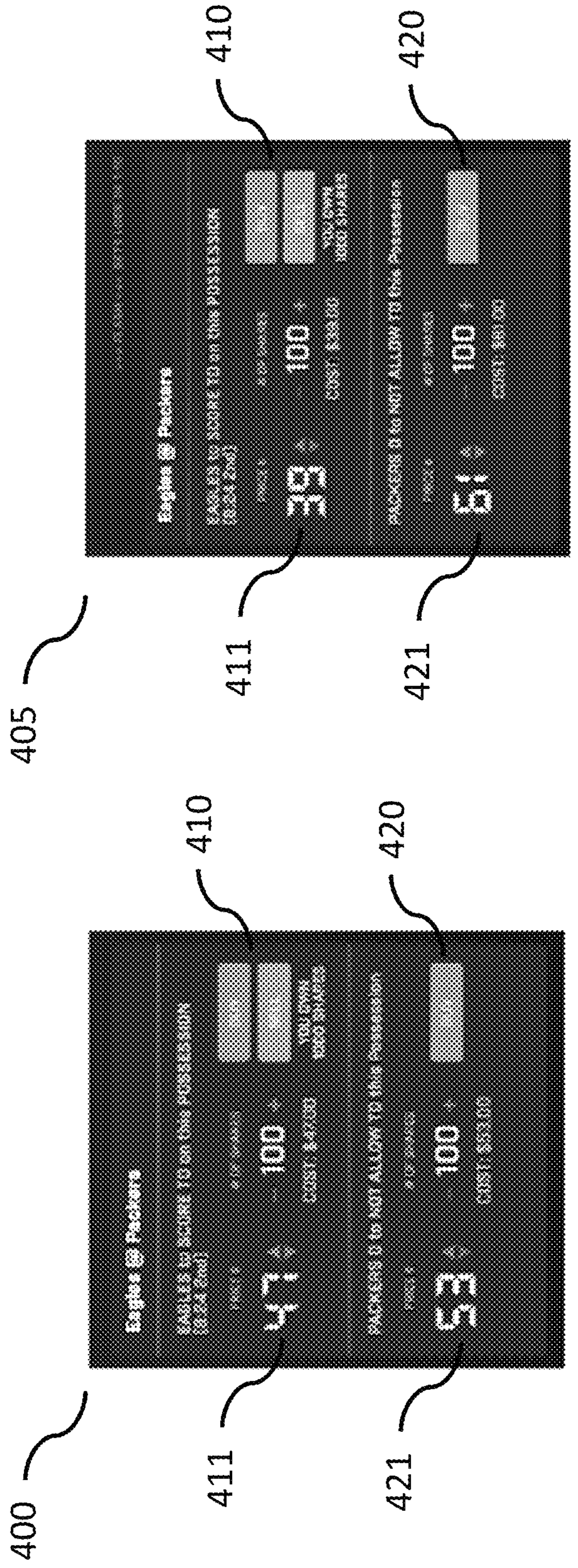
FIG. 4 illustrates a second interface for displaying sports wagering using dynamic real-time pricing and trading according to an embodiment of the present disclosure.

FIG. 4 illustrates a second interface for displaying sports wagering using dynamic real-time pricing and trading according to an embodiment of the present disclosure.

Referring to FIG. 4, the gaming engine can generate double-sided betting scenarios, in other words, betting scenarios that are essentially the opposite results of each other. Interface 400 can show the dual-sided bets at time, $T_1$, and interface 405 can show the dual-sided bets at time, $T_2$. In one embodiment, the double-sided betting scenarios can be displayed on bet selection interfaces 410 and 420 within the application interfaces 400 and 405. Both bet selection interfaces 410 and 420 may display information similar to the information displayed on the bet selection interface 223 disclosed in FIG. 2. In one embodiment, the bet selection interface 410 may display one side of a betting scenario while the bet selection interface 420 may display the other side of the betting scenario.

By way of example, bet selection interface 410 can display a betting scenario from a game between the Philadelphia Eagles and the Green Bay Packers wherein the Eagles are on offense, while the Packers are on defense. The bet selection interface 410 can display a betting scenario generated by the gaming engine or otherwise on whether the Eagles will score a touchdown on their current possession. The bet selection interface 410 may also include a price 411 generated by the gaming engine or otherwise based on the probability that the Eagles will score a touchdown on that current possession. Additionally, the bet selection interface 420 may display a betting scenario on whether the Packers will prevent the Eagles from scoring a touchdown on the Eagles' current possession. The bet selection interface 420 may also include a price 421 generated by the gaming engine or otherwise based on the probability that the Packers will prevent the Eagles from scoring a touchdown on the Eagles' current possession. The prices 411 and 421 may fluctuate based on changes in the sporting event and changes in the probabilities. For example the price 411 may change from 47 at time, $T_1$, to 39 at time $T_2$, and the price 421 may change from 53 at time, $T_1$, to 61 at time $T_2$.

Figure 5:
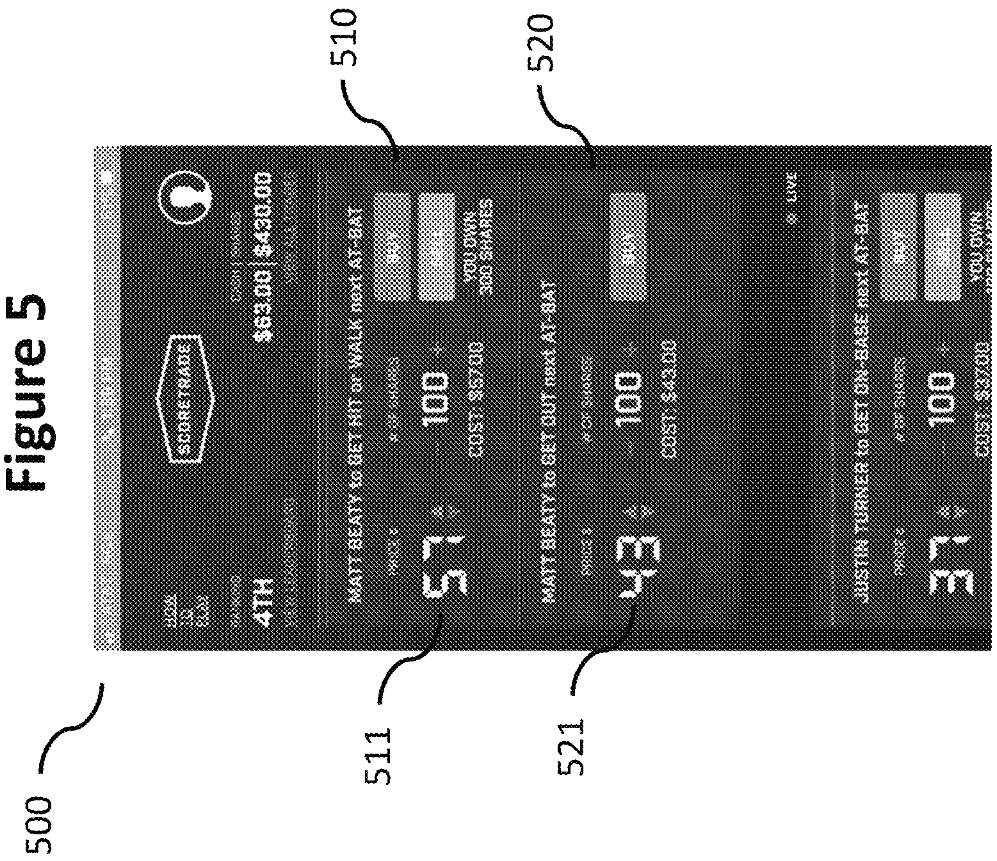
FIG. 5 illustrates a third interface for displaying sports wagering using dynamic real-time pricing and trading according to an embodiment of the present disclosure.

FIG. 5 illustrates a third interface for displaying sports wagering using dynamic real-time pricing and trading according to an embodiment of the present disclosure.

Referring to FIG. 5, the gaming engine can generate multi-sided betting scenarios, in other words, betting scenarios that are related to each other upon certain events occurring. The multi-sided betting scenarios can be displayed on bet selection interface 510 and 520 within the application interface 500. Bet selection interfaces 510 and 520 may display information similar to the information displayed on the bet selection interface 223 disclosed in FIG. 2. The bet selection interfaces 510 and 520 may display multiple sides of a bet. By way of example, bet selection interfaces 510 and 520 may display betting scenarios based on a baseball player's current at bat. The bet selection interface 510 can display a betting scenario that the batter will get a hit or walk in his current at bat. The bet selection interface 510 can also display a price 511 based on the probability that the batter will get a hit or a walk in his current at bat. The bet selection interface 520 can display a betting scenario that the batter will get out in his current at bat. The bet selection interface 520 can also display a price 521 based on the probability that the batter will get a hit or a walk in his current at bat. The prices 511 and 521 may fluctuate based on occurrences in the sporting event and changes in the probabilities. According to this example, only one of the two options can be worth 100 at the end of the player's at bat. The other option may be worth 0.

In another example, the application interface 500 can display multi-sided betting scenarios of varying sizes. By way of example, the application interface 500 may display several betting scenarios based on the Philadelphia Eagles current offensive possession. One betting scenario may be that the Eagles quarterback (QB) will score a touchdown on the current possession, and have a price based on the probability that the QB will score a touchdown on the current possession. A second betting scenario may be a bet that an Eagles wide receiver (WR) will score a touchdown on the current possession, and have a price based on the probability that a particular Eagles WR will score a touchdown on the current possession or also that any Eagles WR will score a touchdown on that possession. A third betting scenario may be a bet that a particular Eagles running back (RB) will score a touchdown on the current possession, and have a price 531 based on the probability that a particular Eagles RB will score a touchdown on the current possession or also that any Eagles RB will score a touchdown on that possession. A fourth betting scenario may be that no Eagles players will score a touchdown on the current possession, and have a price based on the probability that no Eagles players will score a touchdown on the current possession.

In some embodiments, the sum of the prices of the betting scenarios within the multi-sided bet may not equal 100. In other embodiments, the sum of the prices of the betting scenarios within the multi-sided bet may exceed 100. According to various embodiments, each of the prices of the betting scenarios within the multi-sided bet can change independent from the other prices.

In some embodiments, the gaming engine may update a price faster for one bet than the price than another bet. This may be due to the need for a gaming operator (e.g., a human overseeing the operation of a gaming event) to have their profit margin embedded into the prices of the bets where the collective bets are priced to equal more than 100. The total sum of the bet prices may exceed 100 and the goal may be the only pay out 100 to maintain a substantial profit margin. Other reasons may include creating intentional arbitrage opportunities or discounted opportunities to make the game more entertaining by creating more winners.

In some embodiments, the gaming engine can generate betting scenarios for real-time in-game fantasy sports tournaments and leagues. The generated betting scenarios may include bets that a particular player will reach a particular achievement (e.g., a fantasy target). Additionally, the gaming engine can generate a price for the betting scenarios based on the probability that the betting scenario will occur. For example, the generated betting scenario may be that a quarterback will throw for more than 300 yards in his game today or that a running back will score three touchdowns in his game today. According to this embodiment, the user can build a portfolio or a team by selecting a number of these betting scenarios. The user can choose to buy a number of shares that a particular player will reach his fantasy target. Based on the user's strategy, the user can allocate a larger portion of his available tournament funds to the particular player. Over the course of the fantasy sports tournament or league, the user may accumulate points if the wagers become successful. The number of points can be equal to the price of the successful bet. By way of example, if a user places a wager that a quarterback will throw for more than 300 yards in his game today at a price of 60 and the betting scenario occurs, then the user can earn 60 points. Further, a user can sell wagers over the course of the fantasy sports tournament or league. For example, a user may own a wager that a quarterback will throw for more than 300 yards in his game today at a price of 60. Based on the play of the quarterback, the probability that the betting scenario will occur can change. For example, if the quarterback is performing well, the price of the wager may increase to 80. The user can then sell the bet and earn 20 points, the profit from the sale. According to this embodiment, the player that accumulates the most points can be the winner of the tournament.

In one example, a fantasy basketball tournament can have a $1 entry fee and a $100 first place prize. Upon entry into the contest, the user may get a fake $500 budget to assemble a fantasy roster in the form of a portfolio. The potential options for building a fantasy roster may include:

LeBron James to SCORE 25+ points this Game at a price of 45;

Russell Westbrook to SCORE 18+ Points this Game at a price of 36;

Giannis to SCORE 32 Points this Game at a price of 55; or

James Harden to SCORE 36 Points this Game at a price of 32.

In each case as illustrated above, the gaming engine 330 may be configured to take into account numerous factors as discussed herein to determine the opening price. Further, the gaming engine may be configured to continuously evaluate the same factors as well as additional factors once the game starts and thus continuously adjust the price as the game progresses. The objective, for example, may be to take the $500 budget in tournament dollars to buy shares in the fantasy targets that the user sees as their best chance of accumulating the most tournament dollars (e.g., tournament points).

According to this example, the price can be the probability of the player achieving the fantasy target. If the player achieves the fantasy target, the shares will be worth 100. If the player does not, the shares will be worth 0. For instance, if LeBron James scores 30 points during the game, the shares will be worth 100 since the probability of him scoring more than 25 points is 100%. The gaming user, as the game is progressing, may elect to sell shares before the event is over. For instance, if LeBron James has 20 points in the first quarter, the shares might have a price of 90 reflecting the gaming engine's determination that there is a 90% probability of LeBron scoring more than 25 points this game because 3 full quarters are left. As such, a user may be able to see their shares and then buy shares of others players if they want in order to try to win the fantasy tournament.

According to this embodiment, the price can be determined by an algorithm, human input, weighing supply and demand, or a combination taking into account time remaining in the game to achieve the fantasy target, the game situation, whether the player is in the game, injury status, shooting percentage, likelihood of getting fouled out, need for the team to shoot 3 pointers based on how far ahead or behind they are, the level of player involvement in the game, or other factors.

In some embodiments, a fantasy target can also be based on an accumulation of statistics. For example, the fantasy target may be "Lamar Jackson to Score 25 fantasy points or more" where the fantasy points can be based on a combination of yards, touchdowns, and other statistics. The user is buying or selling shares with the price reflecting the probability that Lamar Jackson will achieve his fantasy target of accumulating 25 fantasy points or more.

Figure 6:
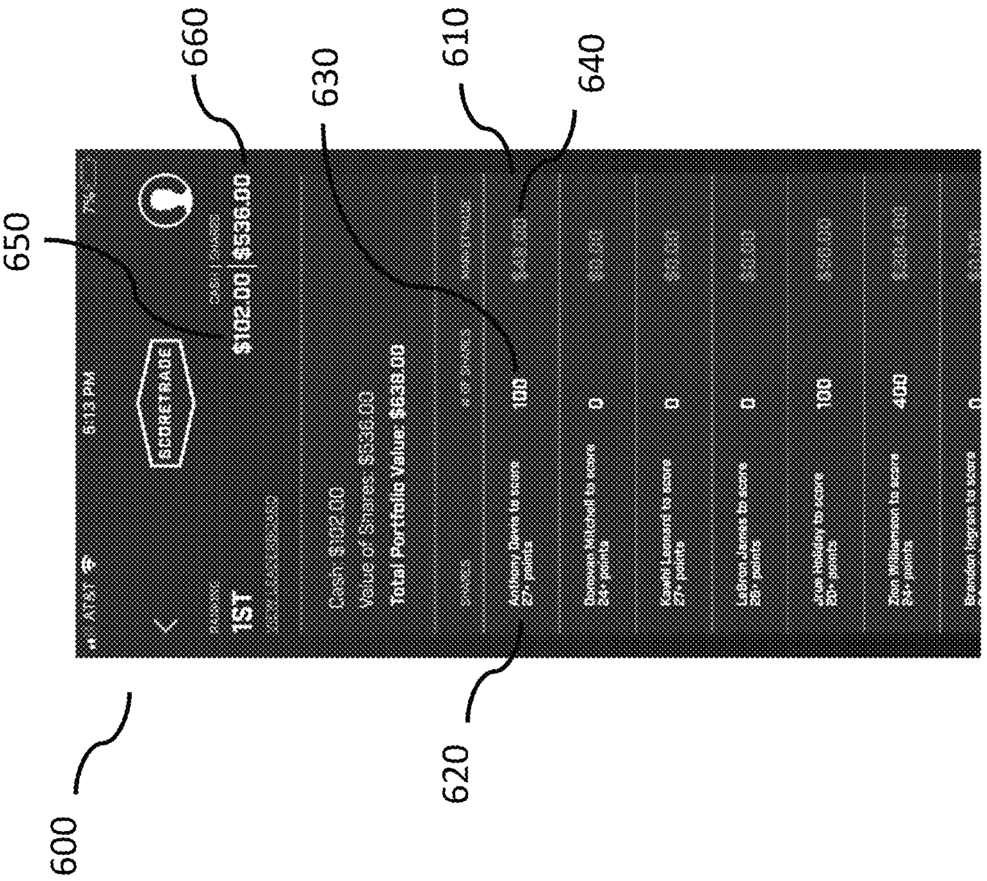
FIG. 6 illustrates an interface for displaying real-time in-game fantasy sports tournaments and leagues using dynamic real-time pricing and trading according to an embodiment of the present disclosure.

FIG. 6 illustrates an interface for displaying real-time in-game fantasy sports tournaments and leagues using dynamic real-time pricing and trading according to an embodiment of the present disclosure.

Referring to FIG. 6, an application interface 600 can show a list of betting scenarios 610 that can be used to build a roster or portfolio for a real-time in-game fantasy sports tournaments and leagues. The betting scenario 610 can include a fantasy target 620, the number of shares 630 of the betting scenario, and the market value 640 (e.g., price) of the betting scenario. The application interface 600 can also display the user's current portfolio budget 650 and total number of portfolio shares 660 owned by the user.

Figure 7:
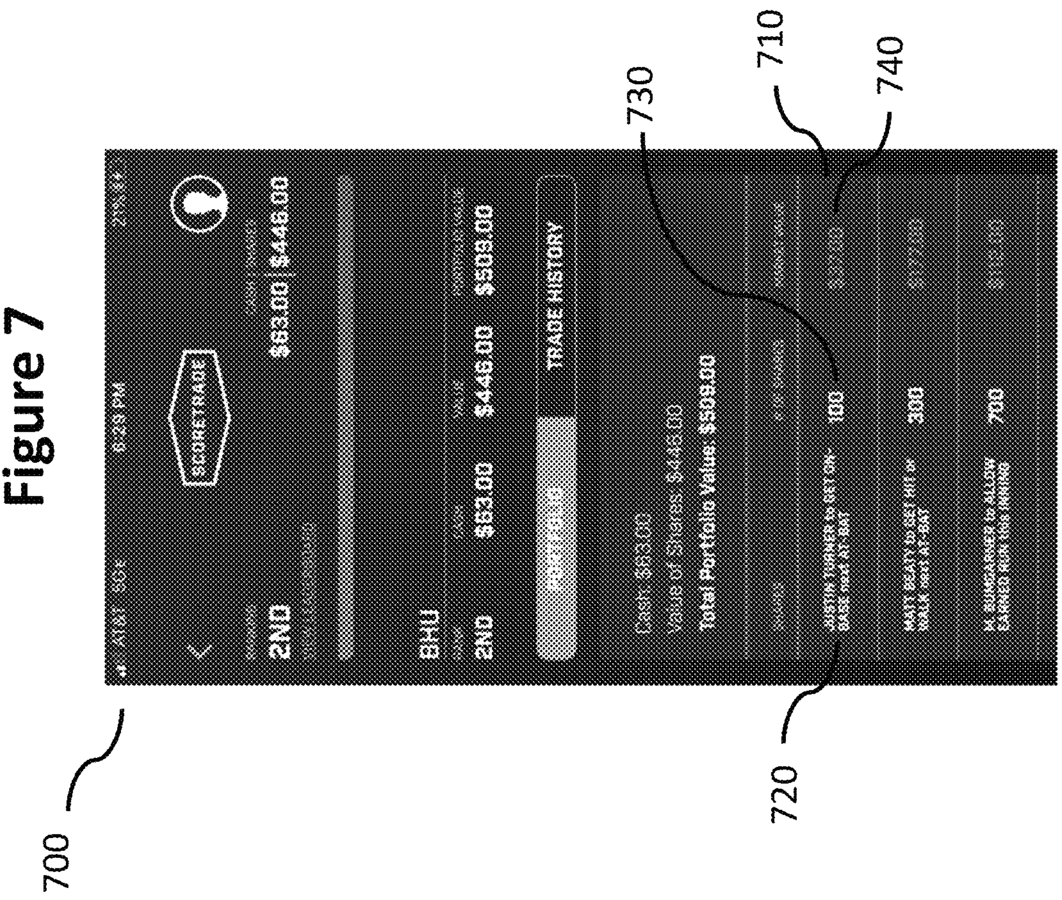
FIG. 7 illustrates an interface for a portfolio in a real-time in-game fantasy sports tournaments and leagues using dynamic real-time pricing and trading according to an embodiment of the present disclosure.

FIG. 7 illustrates an interface for a portfolio in a real-time in-game fantasy sports tournaments and leagues using dynamic real-time pricing and trading according to an embodiment of the present disclosure.

Referring to FIG. 7, an application interface 700 can show a list of betting scenarios 710 that are currently in the user's roster or portfolio for a real-time in-game fantasy sports tournaments and leagues. The betting scenario 710 can include a fantasy target 720, the number of shares 730 of the betting scenario, and the market value 740 (e.g., price) of the betting scenario.

Figure 8:
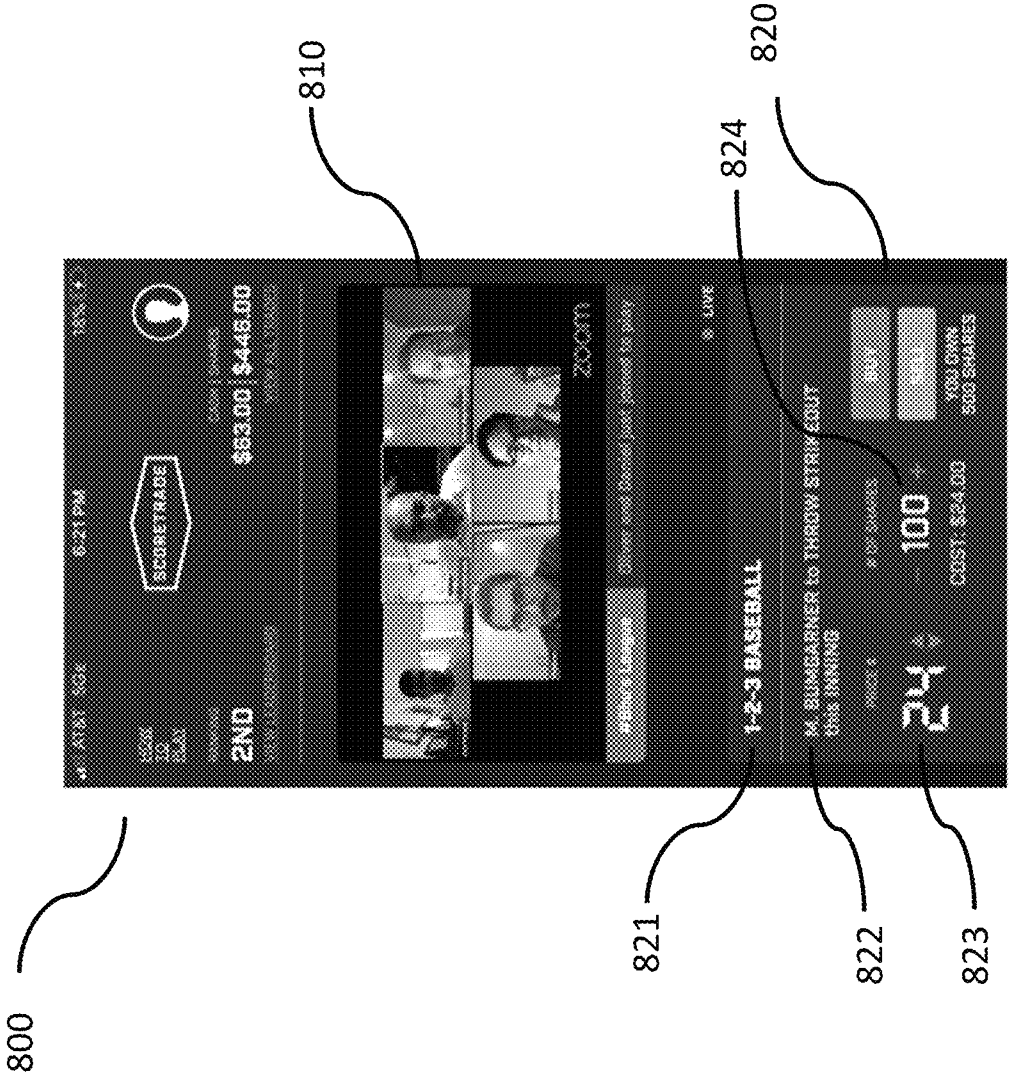
FIG. 8 illustrates an interface of a real-time in-game fantasy sports tournaments and leagues using dynamic real-time pricing that displays a community call according to an embodiment of the present disclosure.

FIG. 8 illustrates an interface of a real-time in-game fantasy sports tournaments and leagues using dynamic real-time pricing that displays a community call according to an embodiment of the present disclosure.

Referring to FIG. 8, the application interface 800 can incorporate a video stream 810 adjacent to a bet selection interface 820. According to this embodiment, video stream 810 may display a collage of videos of one or more of the users in the community call. The users on the call can communicate with each other about current sporting events and bets placed by the players on the community call.

In one embodiment, the gaming engine can generate betting scenarios based on the conversation with the users. For example, the users may be arguing about whether a basketball player will continue his accurate shooting and the gaming engine can generate a betting scenario on whether the basketball player will score 50 points. The generated betting scenario can be displayed on the bet selection interface 820 of each of the guests.

The bet selection interface 820 may include certain information relating to the displayed betting scenario including the title of a sporting event 821, a bet description 822, the price of a single bet share 823, and the total number of shares 824. The information displayed on the bet selection interface 820 can be updated in real time by the gaming engine. The gaming engine may track bets placed by the players in the device application. In some embodiments, the gaming engine may update the price 823 in response to recent events in a live sporting event or in response to bettors placing bets within the device application. For example, the gaming engine may generate a bet on whether a basketball team to win a current game. As the game progresses to its conclusion, the team may be increasing its lead. This may lead to the probability of whether the team will win the game. As such, the gaming engine can adjust the price 823 based on the changing probability of whether the bet will be successful.

Figure 9:
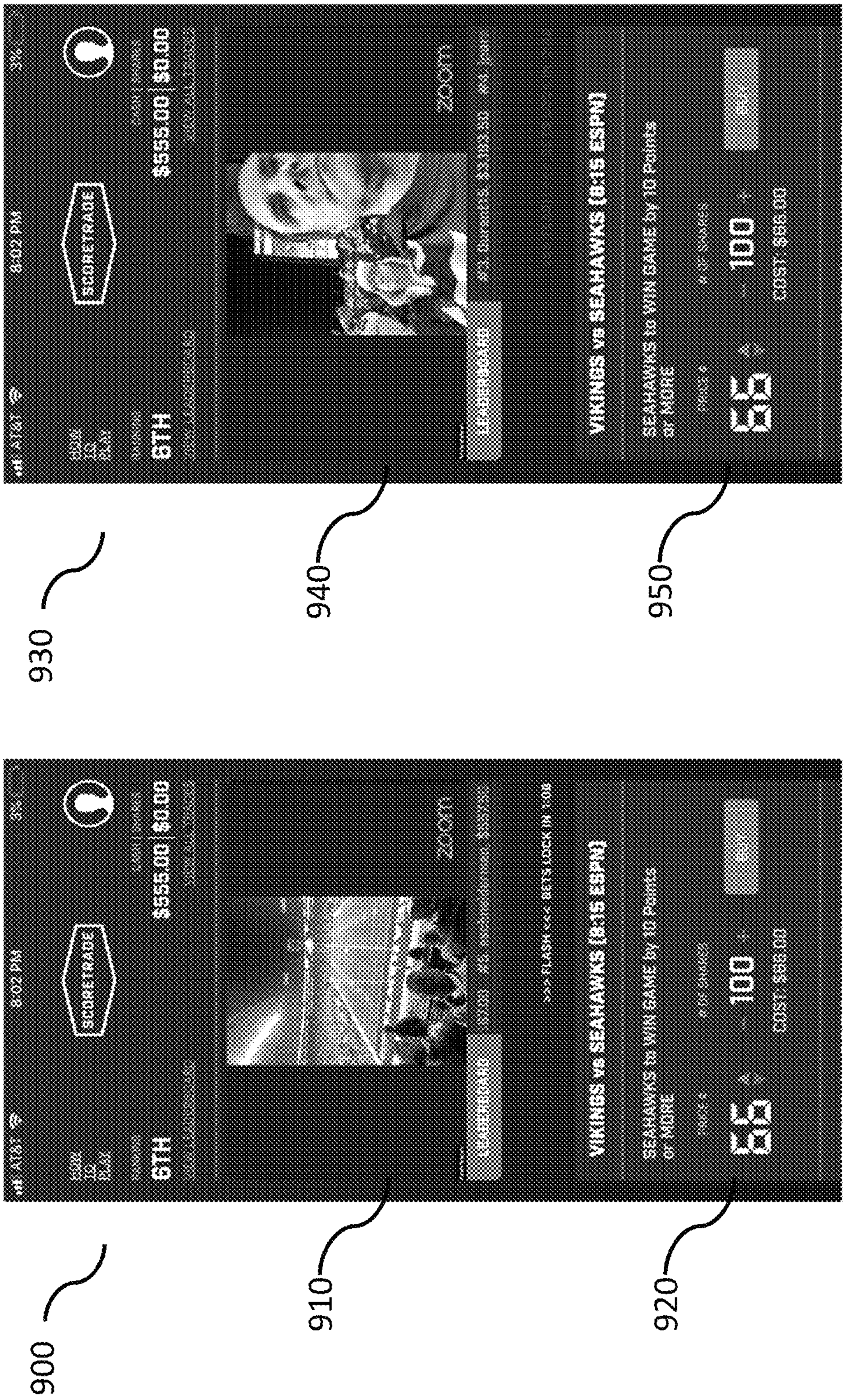
FIG. 9 illustrates an interface of a real-time in-game fantasy sports tournaments and leagues using dynamic real-time pricing that displays a user video stream according to an embodiment of the present disclosure.

FIG. 9 illustrates an interface of a real-time in-game fantasy sports tournaments and leagues using dynamic real-time pricing that displays a user video stream according to an embodiment of the present disclosure.

Referring to FIG. 9, the application interfaces 900 and 930 can incorporate video streams 910 and 940 adjacent to bet selection interfaces 920 and 950. According to this embodiment, video streams 910 and 940 may display a video stream broadcast from a user's device. In some embodiments, the user can use a third party service provider (e.g., Zoom) to transmit the user's video stream to other users.

In one embodiment, the gaming engine can generate betting scenarios based on the content of the video streams 910 and 940. For example, the user broadcasting his video stream may be discussing a running back's current performance in a live football game. The gaming engine may generate a betting scenario on whether the running back will reach 100 yards rushing by the end of the first half. The generated betting scenario can be displayed on the bet selection interfaces 920 and 950.

Figure 10:
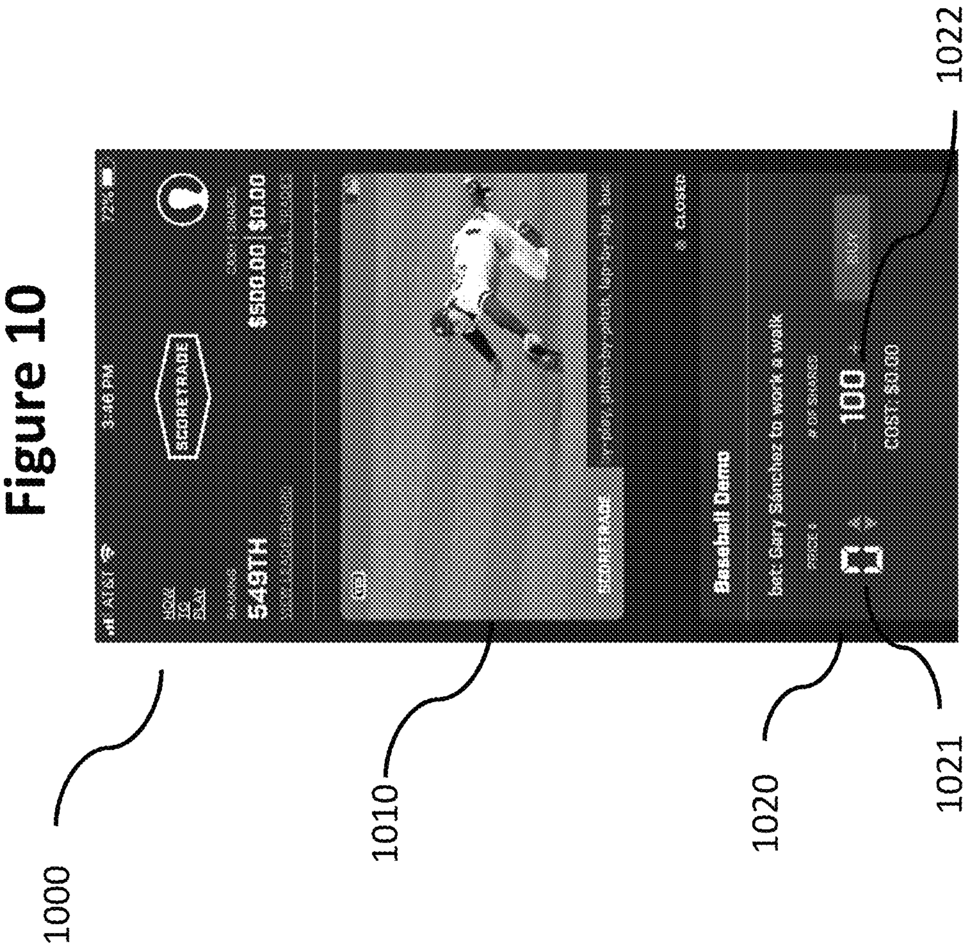
FIG. 10. illustrates an interface of a real-time in-game fantasy sports tournaments and leagues using dynamic real-time pricing that displays a live sporting event according to another embodiment of the present disclosure.

FIG. 10. illustrates an interface of a real-time in-game fantasy sports tournaments and leagues using dynamic real-time pricing that displays a live sporting event according to another embodiment of the present disclosure.

Referring to FIG. 10, the application interface 1000 can incorporate a video stream 1010 adjacent to or as otherwise a part of a bet selection interface 1020. According to this embodiment, video stream 1010 may display a live video broadcast feed from a sporting event. In some embodiments, the bet selection interface 1020 can display betting scenarios based on the sporting event being shown on the video stream 1010. For example, the video stream 1010 may show a baseball game and the bet selection interface 1020 can display a proposed bet on whether the pitcher will strike out the next batter. Further, the gaming engine may be capable of transcribing audio of the video stream 1010 or accessing the closed caption text of the video stream and based on such information, the gaming engine may be able to automatically generate betting scenarios to be offered to users of the application.

The bet selection interface 1020 may include information about various betting scenarios, including among other things, the price of a single share of the bet 1021, and the total number of shares 1022. The information displayed on the bet selection interface 1020 can be updated in real time by the gaming engine.

In order to view a live sporting event on the video stream 1010, the user may be required to have a television provider subscription, such as a cable television subscription or a satellite television subscription. Many common television subscription services provide a username and password to subscribers. The application interface 1000 can allow users to authenticate their subscriptions by allowing them to enter the username and passwords corresponding to their television subscription. The application can verify the username and password information with the corresponding subscription provider. If verification is successful, the application can retrieve the broadcast feed of the live sporting event and display it on the video stream 1010. In one embodiment, with the video stream of the sporting event embedded into the application, the gaming engine can generate betting scenarios based on the sporting event displayed on the video stream. In another embodiment, the user can switch to watch a different live sporting event from the authenticated pay television provider on the video stream 1010. The gaming engine can generate new betting scenarios based on the different live sporting event that is now displayed on the video stream 1010.

According to some embodiments, the gaming engine can incorporate sports wagering activity from various jurisdictions (e.g., U.S. states) to calculate a price. For example, the gaming engine can assess the level of demand for a betting scenario, such as Tom Brady to throw for 300 yards, from across multiple jurisdictions, and use this data to more accurately price this bet in an intra-jurisdictional environment.

In one embodiment, a user can build a portfolio or a team by selecting a player to reach a fantasy target at each position on a traditional sports team roster. The user can select the number of shares for each player that the player will reach his fantasy target. The user, in another variation, may select as few as two players on a team. As the games are progressing, the prices of the betting scenarios change as calculated by the gaming engine taking into account sports data and historical data and predicting the likelihood of each betting scenario occurring and the user can buy or sell shares, constantly adjusting his portfolio to maximize the portfolio. The price can be the probability of the player scoring the most fantasy points compared to the other players listed at the same position. For example, the user may be provided the following betting scenarios below which, in this case, display the objective, the player's name, and the opening price which is calculated by the gaming engine based on taking into account the sports data and historical data as described herein and by comparing the applicable data of the players offered against each other:

Which QB listed below will score most fantasy points today:

Drew Brees—50

Tom Brady—25

Aaron Rodgers—25

Which RB listed to score most fantasy points today:

Christian McCaffrey—23

Saquon Barkley—66

Ezekiel Elliott—11

WR to SCORE most Fantasy Points today:

Michael Thomas—24

Davante Adams—26

Tyreek Hill—50

TE to SCORE most fantasy points today:
Travis Kelce—35
Zach Ertz—35
George Kittle—30
K to SCORE most fantasy points today:
Justin Tucker—32
Harrison Butker—33
Wil Lutz—45
D/Special Teams to SCORE most fantasy points today:
San Francisco—60
Baltimore—20
Pittsburgh—20

In another embodiment, the gaming engine can generate betting scenarios for a fantasy basketball tournament and priced in real-time in a manner compliant with local fantasy gaming regulations. The betting scenarios may include a fantasy target and a list of basketball players. The fantasy targets may include, but are not limited to the first player to score 10 points, the first to rebound, or the first player to get 10 assists. The user can select two or more players from the list that the user believes will achieve the fantasy target. The user can select the players by buying shares using the tournament dollars. For example, the betting scenario may be:

First 5 players to SCORE in Tonight's Game:
Player 1
Player 2
Player 3
Player 4
. . .
Player 23
Player 24

Each of the players listed may be displayed with a price as calculated by the gaming engine reflecting the gaming engine's prediction of the probability that the player will be among the first five players to score in the game. As each player becomes one of the first five players to score in the game, his price will be worth 100. The prices of the players that were not one of the first five players to score will become 0. As will be appreciated, countless other betting scenarios along the lines of the example above could also be generated with the gaming engine predicting the probabilities for each player in each scenario.

In another embodiment, the gaming engine can generate a sequential fantasy game created for a half-inning of baseball. According to this embodiment, the gaming engine may generate a list of potential outcomes of the current batter. For example, the outcomes may include: the batter to hit a single, the batter to strike out, the batter to get an extra base hit, the batter to ground out, or the batter to walk. Using the tournament dollars, the user can choose to buy shares in the outcome of the batter. In some embodiments, the engine can also generate a list of potential outcomes of the pitcher in the current at bat. The system can also validate that the user has some shares in players on both teams, both the pitcher and batters, as most states do not consider a fantasy game to simply involve selections on one team's roster. The same type of sequence of batters and pitchers may be repeated for the other half of the inning or any number of innings.

In another embodiment, the gaming engine can generate betting scenarios where one sports player's individual achievements are compared against another sports player's individual achievements in their respective current sports games (i.e., a head-to-head matchup). The two sports players may or may not be playing in the same sports game. The user can select the number of shares for the sports player that the user believe will have greater individual achievements in his game. If the selected sports player has greater individual achievements in his game than the other sports player in his game, then the selected sports player's price will be 100. As the games are progressing, the probability and price of each of the sports players can change as the gaming engine continuously reevaluates the probability of each betting scenario occurring to reflect the real-world performance and the likelihood of each player outscoring or out achieving the other player in his head-to-head matchup. The user can trade in and out shares to accumulate the most tournament dollars. This head-to-head matchup format can be used for any sport and a variety of fantasy targets. Examples of betting scenarios according to this embodiment, may include:

LeBron to SCORE more than Kawhi Leonard—55;
Kawhi to SCORE more than LeBron—45;
Russell Westbrook to SCORE more than Chris Paul—32;
Chris Paul to SCORE more than Russell Westbrook—68;
Steph Curry to HIT more 3-pointers than James Harden—66; or
James Harden to HIT more 3-pointers than Steph Curry—34.

In some embodiments, the fantasy targets may be full game targets or in-game targets. Examples of in-game targets may include:

Steph Curry to HIT 2 3-pointers in the First Quarter at a price of 45;
LeBron James to SCORE 5 points in the First Quarter at a price of 40; or
Russell Westbrook to have 3 ASSISTS by 6:00 mark of $2^{nd}$ quarter at a price of 65.

In one embodiment, a fantasy tournament may incorporate auto racing. In one example, the gaming engine 330 may be configured to offer a user the ability to select a driver to be in the top 5 by Lap 50. For example, Kyle Busch to be in Top 3 at end of Lap 50 could be priced at 50 by the gaming engine and Chase Elliot to be in Top 3 at end of Lap 50 could be priced at 10 by the gaming engine. As will be appreciated, the gamine engine 330 could offer each driver at a price, which could fluctuate during the race, taking into account distance between drivers, current position, pit-stops, and other factors.

In another embodiment, a fantasy tournament can be run for a single hole of a golf tournament across multiple players. The gaming engine 330 can determine which golfers are playing which hole or which players may be playing a particular hole based on the sports data received. According to this embodiment, the following fantasy betting scenarios could be generated by the gaming engine:

Tiger Woods to shoot PAR or BETTER on hole 12 at a price of 75;
Brooks Koepka to shoot PAR or Better on hole 11 at a price of 60;
Phil Mickelson to shoot BIRDIE or BETTER on hole 11; or
Jason Day to shoot PAR or BETTER on hole 10.

Further, the gaming engine could determine that the fantasy tournament is likely to end in 20 minutes as the golfers will be simultaneously playing their final holes. In another embodiment, the fantasy betting scenarios could be offered sequentially. For example, if Tiger Woods achieves a par or better on hole 12, then the gaming engine could generate betting scenarios for Tiger Woods on hole 13.

In some embodiments, the gaming engine can use the location of a user to determine what fantasy tournaments comply with local sports gaming regulations. For example, some U.S. states may have regulations that can allow for partial game fantasy contests, whereas other states may only allow fantasy games to be based on the full game results of a real world player in a real world sporting event. For instance, a fantasy target on Tom Brady to PASS for 75 yards in the first quarter may be allowed in one state whereas in another state, only a full game target of Tom Brady to pass for 275 yards for the game may be allowed. Accordingly, the gaming engine 330 could be configured to only offer the partial game betting scenario in certain states and the full game betting scenario in other states.

Further, some U.S. states have legalized sports betting, and most U.S. states do not consider fantasy gaming tournaments to be sports wagering. Additionally, due to the U.S. Wire Act, transmitting sports wagering information across U.S. state lines is a federal offense. In one embodiment, the gaming engine can use data and inputs from fantasy tournaments to price in-game bets in U.S. states where sports betting is legal and transmit this data to the U.S. states where sports betting is legal as fantasy sports data. This can allow the gaming engine to run fantasy sports tournaments across multiple U.S. states. Using this fantasy sports wagering data, real money sports bets intrastate can be priced in real-time using inputs from users reactions across U.S. state lines without violating the Wire Act.

In some embodiments, the gaming engine can generate betting scenarios for in-game sports betting tournaments. According to this embodiment, the gaming engine can generate bets based on the final outcome of live sporting events or based on team-oriented bets. For example, a tournament can be based on a March Madness Bracket tournament and the prices of the generated bets can be updated in real-time throughout each game.

In some embodiments the gaming engine can generate betting scenarios for simple cash wagers. For example, the gaming engine can generate a bet that a quarterback will throw for more than 300 yards in his game today. The user can place a wager against another user in a peer-to-peer gaming event or against the house.

In some embodiments, the artificial intelligence of the gaming engine can be trained to be able to more accurately determine probabilities of certain events occurring and thus to be able more accurately price betting scenarios. For example, the gaming engine could be configured to evaluate how often users place a wager on either side of a two-sided bet based on particular prices set for that betting scenario and to thereafter adjust the price of future similar betting scenarios based on the past human behavior of either side of the betting scenario being chosen based on a particular price.

In some embodiments, the probabilities of players achieving fantasy targets generated by the gaming engine can be exported to other gaming formats offered by third party operators. For example, third party operators can use the gaming engine's 0-100 prices as a factor in generating their own pricing formats.

In some embodiments, the gaming engine's pricing and probabilities can be used in electronic sports (e-sports), including, but not limited to, console video games and mobile device video games.

It will be understood that when an element is referred to as being "on," "connected to," or "coupled to" another element, it may be connected, or coupled to the other element or one or more intervening elements may also be present. When an element is referred to as being "directly connected to," or "directly coupled to" another element, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a) and 35 U.S.C. § 132(a).

The term "processing circuit" is used herein to mean any combination of hardware, firmware, and software, employed to process data or digital signals. Processing circuit hardware may include, for example, radio baseband processors (BPs or BBPs), application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Various computational portions of embodiments of the present invention, including the operation of a sports gaming event through a computing device application, may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs). The computer system may also include peripherals such as communications devices (e.g., network adapters, serial or parallel data bus adapters, graphics adapters) for transmitting and/or receiving data to and from other devices such as data storage systems (e.g., databases), display devices, and other computer systems. The computations may be distributed across multiple separate computer systems, some of which may be local to the users (e.g., user devices such as smartphones and personal computers) and some of which may be remote (e.g., off-site, "cloud" based computing resources connected to the user devices through a wide area network such as the Internet).

Although example embodiments of the system and method for sports wagering using dynamic real-time pricing and trading have been described and illustrated herein, many modifications and variations within those embodiments will be apparent to those skilled in the art. Accordingly, it is to be understood that the system and method for sports wagering using dynamic real-time pricing and trading according to the present invention may be embodied in forms other than as described herein without departing from the spirit and scope of the present invention. The present invention is defined by the following claims and equivalents thereof.

What is claimed is:

1. A system for operating a sports gaming event using a graphical interface of a computing device application, the system comprising:
- a processor; and
- a memory coupled to the processor, wherein the memory stores instructions that, when executed by the processor, cause the processor to:
  - receive sports data about a sporting event via a network;
  - determine a gaming event format based on the sports data;
  - access a database of historical statistics relating to the sporting event and to players playing in the sporting event;
  - generate a plurality of betting scenarios in a betting scenario database according to the gaming event format;
  - select at least one betting scenario from the betting scenario database based on the sports data and the historical statistics;
  - calculate an initial probability of each of the betting scenarios occurring based on the sports data and the historical statistics;
  - generate an initial price of each of the betting scenarios based on the initial probability of each respective betting scenario being successful, wherein the initial price comprises a number between 1 and 99;
  - display each of the betting scenarios and the initial prices on the graphical interface; and
  - receive a selection of a portfolio of betting scenarios from at least one user, wherein the portfolio of betting scenarios is selected from the plurality of betting scenarios.

2. The system according to claim 1, wherein the instructions further cause the processor to:
- receive updated sports data via the network;
- calculate an updated probability of the betting scenarios being successful based on the updated sports data;
- generate an updated price of the betting scenarios based on the updated probability;
- and
- display the updated price for the betting scenarios on the graphical interface.

3. The system according to claim 2, wherein the updated price is based in part on responses received from the at least one user.

4. The system according to claim 2, wherein the updated price is based in part on a location of the at least one user and on the response from the at least one user.

5. The system according to claim 1, wherein the instructions further cause the processor to:
- receive updated sports data via the network;
- generate a new betting scenario based on the updated sports data;
- calculate an initial probability of the new betting scenario occurring based on the updated sports data;
- generate a new initial price of the new betting scenario based on the initial probability of the new betting scenario occurring;
- and
- display the new betting scenario and the initial price of the new betting scenario on the graphical interface.

6. The system according to claim 1, wherein the response from the at least one user comprises at least one of a buying of at least one share of the betting scenario and a selling of at least one share of the betting scenario.

7. The system according to claim 1, wherein the sports data is received from a third party vendor via the network.

8. A method for operating a sports gaming event using a graphical interface of a computing device application, the method comprising:

receiving, by a processor, sports data via a network;

determining, by the processor, a gaming event format based on the sports data;

generating, by the processor, a plurality of betting scenarios according to the gaming event format and based on the sports data;

calculating, by the processor, an initial probability of each of the plurality of betting scenarios occurring;

generating, by the processor, an initial price of each of the betting scenarios based on a respective initial probability, wherein the initial price comprises a number between 1 and 99;

displaying, by the processor, the plurality of betting scenarios and the respective initial prices on the graphical interface; and receiving, by the processor, a selection of a portfolio of betting scenarios from at least one user, wherein the portfolio of betting scenarios are selected from the plurality of betting scenarios.

9. The method according to claim 8, the method further comprising:

receiving, by the processor, updated sports data via the network;

calculating, by the processor, an updated probability of the betting scenarios occurring based on the updated sports data;

generating, by the processor, an updated price of the respective betting scenarios based on the updated probability;

and displaying the updated price on the graphical interface.

10. The method according to claim 9, wherein the updated price is based in part on responses received from the at least one user.

11. The method according to claim 9, wherein the updated price is based in part on a location of the at least one user and the response from the at least one user.

12. The method according to claim 8, the method further comprising:

receiving, by the processor, updated sports data via the network;

generating, by the processor, a new betting scenario based on the updated sports data;

calculating, by the processor, an initial probability of the new betting scenario occurring based on the updated sports data;

generating, by the processor, an initial price of the new betting scenario based on the initial probability of the new betting scenario occurring;

and displaying, by the processor, the new betting scenario and the initial price of the new betting scenario on the graphical interface.

13. The method according to claim 8, wherein the response from the at least one user comprises at least one of a buying of at least one share of the betting scenario and a selling of at least one share of the betting scenario.

14. The method according to claim 8, wherein the sports data is received from a third party vendor via the network.

* * * * *